United States Patent [19]

Long, Jr.

[11] Patent Number: 4,695,388

[45] Date of Patent: Sep. 22, 1987

[54] APPARATUS AND PROCESS FOR RAPID SEWAGE SLUDGE SEPARATION

[75] Inventor: Charles A. Long, Jr., Birmingham, Ala.

[73] Assignee: Long Enterprises, Inc., Birmingham, Ala.

[21] Appl. No.: 851,600

[22] Filed: Apr. 14, 1986

Related U.S. Application Data

[63] Continuation-in-part of Ser. No. 650,960, Sep. 14, 1984, Pat. No. 4,582,612, which is a continuation-in-part of Ser. No. 560,058, Dec. 9, 1983, Pat. No. 4,487,699.

[51] Int. Cl.$^4$ .............................................. C02F 1/78
[52] U.S. Cl. .................................. 210/760; 210/806; 210/808; 210/130; 210/201; 210/207; 210/221.2; 210/533; 210/540
[58] Field of Search ............... 210/537, 538, 540, 539, 210/221.2, 533, 764, 926, 758, 760, 774, 805, 806, 808, 103, 130, 132, 198.1, 200, 201, 202, 205, 206, 207, 209, 218

[56] References Cited

U.S. PATENT DOCUMENTS 3,444,076  5/1969  Sekikawa et al. ................ 210/221.2

Primary Examiner—Frank Sever
Attorney, Agent, or Firm—Panitch Schwarze Jacobs and Nadel

[57] ABSTRACT

The present invention relates to an apparatus for use in a sewage sludge treatment system comprising a hyperbaric vessel including sludge inlet means for conveying sludge to the vessel to be accumulated in a lower portion of the vessel, a sludge delivery means having a discharge end for delivering sludge particles from the lower portion to an upper portion of the vessel, oxygen inlet means for delivering oxygen to the upper portion of the vessel to oxygenate the sludge particles at a hyperatmospheric pressure therein, the oxygenated particles falling to and being collected in the lower portion of the vessel, gas outlet means for removing gas from the upper portion of the vessel, a sludge outlet means for rapidly removing the oxygenated sludge from the lower portion of the vessel using the pressurized oxygen as a propellant, the sludge outlet means comprising a discharge pipe connected to the lower portion of the vessel for conducting sludge to a separation apparatus, and a rapidly opening valve means controlling flow of the oxygenated sludge through the discharge pipe.

13 Claims, 1 Drawing Figure

APPARATUS AND PROCESS FOR RAPID SEWAGE SLUDGE SEPARATION

CROSS-REFERENCE TO RELATED APPLICATIONS

This application is a continuation-in-part of co-pending U.S. Pat. application Ser. No. 650,960, filed Sept. 14, 1984, entitled "Improved Sewage Sludge Treatment Apparatus" (the "co-pending application") now U.S. Pat. No. 4,582,612, issued Apr. 15, 1986, which, in turn, was a continuation-in-part of U.S. patent application Ser. No. 560,058, filed Dec. 9, 1983, which issued as U.S. Pat. No. 4,487,699 (the "original patent"). This application also is related to co-pending U.S. patent application Ser. No. 823,899 filed Jan. 30, 1986, entitled "Apparatus for Dispersing Sludge with Gas Impingement" (the "related application").

BACKGROUND OF THE INVENTION

This invention relates to an apparatus and process for enhancing the separation of treated sewage and, in particular, sewage sludge, of the type preferably as set forth in the above-identified co-pending and related applications and original patent. More specifically, the present invention relates to an apparatus and a process for rapidly removing oxygenated sludge from the lower portion of a reaction vessel using pressurized oxygen as a propellant.

Traditionally, sewage, and specifically sludge, has been difficult to treat because it is, almost by definition, extremely variable in composition. In addition to human liquid and solid organic waste, the sludge to be removed and separated in accordance with the present invention, may include industrial and commercial sludge which is susceptible to aerobic treatment. In general, the present invention provides a flexible and efficient means for removing and enhancing the separation of previously oxygenated sludge.

The present invention employs the use of at least one hyperbaric vessel containing pressurized oxygen and sludge which act in concert to create a pressure differential with a separation apparatus maintained at a lower pressure. The resulting pressure differential commences the rapid removal of the sludge from the hyperbaric reaction vessel.

A further feature of the present invention resides in substantially infinite adjustability of the various components of the apparatus and process so that they can be finely tuned at any time and adjusted automatically, semi-automatically, and/or manually to remove different types, compositions and viscosities of various sludges without requiring the use of alternative equipment.

The present invention is intended primarily to be used in conjunction with treatment of activated sludge, namely, waste from domestic, commercial and industrial sources which create a biologically degradable material. A batch of pH adjusted waste to be treated is divided into small droplets and the droplets are dispersed within a pressure vessel where they are oxygenated by being exposed to oxygen ($O_2$) and ozone ($O_3$) for a substantial period of time. The Biological Oxygen Demand (BOD) and the Chemical Oxygen Demand (COD) of the waste are substantially saturated and satisfied. The addition of ozone produces an almost complete destruction and elimination of coliform, fecal coliform, salmonella, and other harmful bacteria from the batch of sludge being treated. The resulting oxygenated sludge is rapidly removed from the vessel to a separation apparatus where it is further treated by standard treatment processes and apparatus including percolation means to be divided into its gas, liquid and solid components. These components are subsequently further treated or discharged.

The present invention can be used in conjunction with the inventions as illustrated, described and claimed in the prior filed co-pending and related applications and original patent, the disclosures of which are hereby incorporated by reference herein. The present invention preferably is used with the same systems and same types of reactor assemblies used in the processes and apparatus disclosed in the co-pending and related applications and the original patent. Therefore, only the components of the overall system which are necessary to understand the present invention will be described herein. In addition, the present invention can be incorporated with presently existing waste water treatment plants.

It is believed that the rapid removal of sludge from the reaction vessel by using pressurized gas enhances the separation process of the sludge. It is further believed that the sludge is more effectively and efficiently divided into its component parts by this process than traditional long-term sedimentation tanks. The present invention results in a cost-effective and time-saving apparatus and process for rapid sewage sludge separation.

SUMMARY OF THE INVENTION

The present invention includes an apparatus for use in a sewage sludge treatment system comprising a hyperbaric vessel including sludge inlet means for conveying sludge to the vessel to be accumulated in a lower portion of the vessel, a sludge delivery means having a discharge end for delivering sludge particles from the lower portion to an upper portion of the vessel, oxygen inlet means for delivering oxygen to the upper portion of the vessel to oxygenate the sludge particles at a hyperatmospheric pressure therein, the oxygenated particles falling to and being collected in the lower portion of the vessel, gas outlet means for removing gas from the upper portion of the vessel, a sludge outlet means for rapidly removing the oxygenated sludge from the lower portion of the vessel using the pressurized oxygen as a propellant, the sludge outlet means comprising a discharge pipe connected to the lower portion of the vessel for conducting sludge to a separation apparatus, and a rapidly opening valve means controlling flow of the oxygenated sludge through the discharge pipe.

BRIEF DESCRIPTION OF THE DRAWING

For the purpose of illustrating the invention, there is shown in the drawing a form which is presently preferred, it being understood, however, that this invention is not limited to the precise arrangement and instrumentality shown.

The sole drawing figure is a side elevational view, of one embodiment of reactor assemblies and related components in accordance with the present invention.

DESCRIPTION OF THE PREFERRED EMBODIMENT

Figure 1:
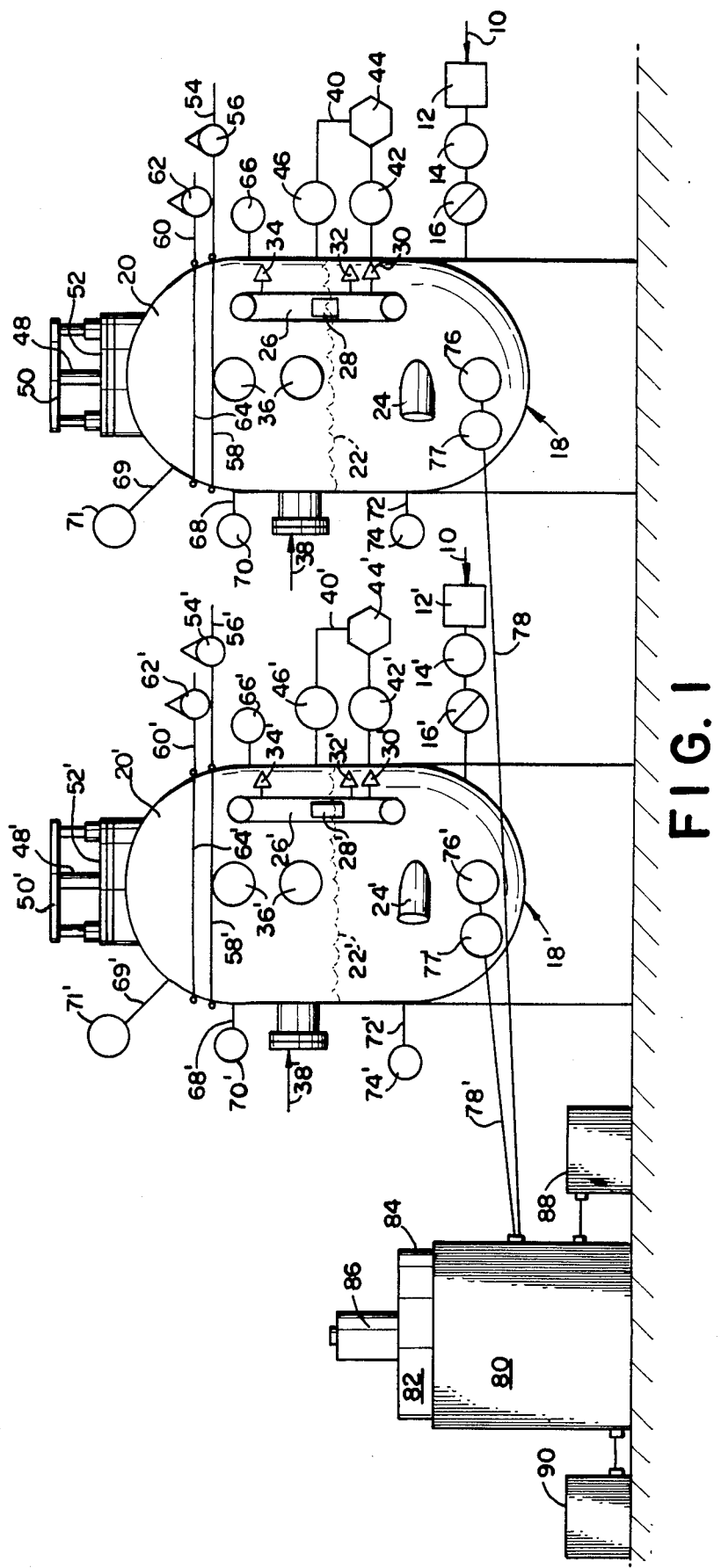

Referring to the drawing in detail wherein like numerals indicate like elements, there is shown one arrangement of apparatus according to the present invention to be used in a large-scale sewage treatment system. The present invention can be incorporated with presently existing waste water treatment plants. Thus, the invention is being described with respect to certain components of conventional treatment systems to indicate how the present invention can be integrated in an overall sewage treatment system. The conventional components will be described in sufficient detail only to make it clear how the present invention can be coordinated with them.

Sludge initially, in conventional waste water treatment plants, is treated with sludge thickeners. The treated sludge is then ground up or comminuted into fine particles and transported into a sludge holding tank where it is subject to a pH adjustment operation. The sludge is mixed with acid until a uniform mixture of acid and sludge is obtained with a desired pH of from about 3 of about 4.5. It is believed that the optimum value of pH adjustment for most sludge to be treated in accordance with the process is from 3 to 3.5, although the optimum pH for a particular sludge composition may vary, depending upon experience.

After the pH of the sludge is adjust to an appropriate level, it is pumped through reactor inlet conduit 10 by reactor inlet pump 12 toward reactor assembly 18 used in conjunction with the present invention. The sludge may be directed towards a single or multiple number of reactor assemblies as illustrated, described and claimed in the prior filed co-pending application and original patent. The present invention preferably is used with the same systems and types of reactor assemblies used in the processes and apparatus disclosed in the co-pending and related applications and the original patent. However, the present invention can be used effectively with any type of hyperbaric vessel in which a pressurized oxygen containing atmosphere is maintained in an upper portion and sludge which becomes oxygenated in the vessel is maintained in a lower portion of the vessel. In addition, the present invention can be incorporated with presently existing waste water treatment plants.

Reactor inlet pump 12, 12' is preferably driven by a hydraulic motor due to the ability of these motors to be adjusted precisely. Pump 12, 12' pumps sludge from the pH adjustment tank through reactor inlet conduit 10, 10', remote control reactor inlet valve 14, 14' reactor inlet check valve 16, 16' and into reactor assembly 18, 18'. Again, depending upon the capacity of the pH adjustment tank, the pump, conduits, valves and other components of the inlet means, any one or any number of reactor assemblies 18, 18' can receive sludge in series, in parallel, or simultaneously, depending also upon the desired control of the waste treatment system.

To make the explanation easier to understand, reference will be made only to reactor assembly 18, it being understood that substantially similar arrangements could be associated with reactor assembly 18' or any other reactor assemblies forming part of this system. A major component of reactor assembly 18 is a treatment vessel 20 supported above a foundation by any suitable type and strength of support members. Although treatment vessel 20 can be of any desired size, it is preferred that it be capable of handling a large volume of sludge. Typical dimensions of the vessel having a shape illustrated in FIG. 1 would be about twelve feet in diameter and about sixteen feet in height. Treatment vessel 20 may be made in shapes other than that illustrated. The vessel should be able to withstand pressures of at least about six atmospheres, since the sludge is subject to hyperbaric, that is pressurized, treatment. Accordingly, the material used to make the vessel should be durable as well as easy to maintain and non-reactive with the acidified sludge environment. A suitable material would be stainless steel, for example.

A manhole opening is located in a portion of treatment vessel 20, preferably at the top. A flange is formed around the upper rim of the manhole opening. As illustrated in the drawing, sludge 22 is contained in a lower portion of the vessel after entering the vessel through the reactor inlet conduit 10. The "lower portion" of the vessel includes any portion of the vessel containing liquid, and need not be limited to any particular volume of sludge within the vessel. However, it is important that there be an upper portion of the vessel not filled with sludge located above the level of sludge 22 and above a discharge end of means for dispersing the sludge into the upper portion. The upper portion of the vessel, likewise, is not defined by any specific volume, but should be sufficient to contain first and second dispersing means claimed and described in the prior filed co-pending application and original patent, and should have sufficient volume so that the dispersed sludge can interact completely with oxygen in the upper portion.

A reactor mixer is schematically illustrated and is identified by numeral 24. The mixer preferably includes a hydraulically driven motor to which a propeller or other mixing means is attached to insure uniform mixing of the sludge. The details of the mixer assemblies, including the hydraulic drive means, are not illustrated since they are conventional.

Attached to treatment vessel 20 is a reactor sight tube assembly 26. Reactor sight tube assembly 26 includes a float 28, a low level or empty switch 30, a one-half full switch 32, and a full level switch 34. Treatment vessel 20 is provided with a plurality of view ports 36. To aid in viewing the contents of the vessel, a number of lighting sources can also be provided. An example of one such light source 38 is illustrated generally schematically.

In general, treatment of the sludge contained in treatment vessel 20 is accomplished by delivering the sludge from the lower portion of the vessel to the upper portion of the vessel and dispersing it as small particles throughout the pressurized oxygen-rich atmosphere in the upper portion of the vessel. This is accomplished in any suitable manner. By way of example, with reference to the drawing, sludge 22 is delivered by delivery means from the lower portion to the upper portion of the vessel. The delivery means includes a reactor circulation conduit 40 at the bottom of treatment vessel 20, a reactor circulation valve 42, a reactor circulation pump 44, a reactor circulation valve 46, and an internal reactor circulation conduit (not shown) having an upright portion and a discharge end located above the sludge in the lower portion of the vessel, as illustrated in detail in the co-pending and related applications and in the original patent. Preferably, circulation pump 44 is driven by a hydraulic motor to take advantage of the good control and infinitely adjustable variable speeds associated with hydraulic motors. Valves 42 and 46 are remotely controlled. Furthermore, additional valves can be included in the delivery means for back-up, automatic, semi-automatic, or manual control, if desired.

In general, treatment of the sludge is initiated when the sludge enters the reactor vessel and begins to react with the oxygen in the upper portion. To enhance the reaction, the sludge should be dispersed throughout the upper portion in fine particles. This can be accomplished by any number of different types of dispersing means, but those specifically disclosed in the co-pending and/or related applications and in the original patent are preferred. In order to efficiently divide the sludge into fine particles the dispersing means are sometimes used in sequence, in which the output of a first dispersing means forms the input for a second dispersing means. The present invention, as will be apparent to those skilled in the art, can be utilized with various reactor assemblies and dispersing means and is not limited to those means disclosed in the co-pending and related applications and the original patent.

In the preferred embodiment, sludge 22 is pumped through conduit 40 through a channeling means and discharged through the end of a discharge pipe toward a first sludge dispersing means (not shown) where the sludge is separated into channels and directed toward a second sludge dispersing means (not shown). The second dispersing means is located within the upper portion of the vessel and is oriented with respect to the first sludge dispersing means so that a major portion of the sludge being channeled from the first sludge dispersing means is dispersed by the second sludge dispersing means into fine particles within the upper portion of the reactor vessel. Because two dispersing means are used, the sludge is finely comminuted and completely dispersed in the oxygen-rich atmosphere of the upper portion of the vessel. These dispersed particles become oxygenated as they interact with the oxygen in the upper portion of the vessel. The oxygenated sludge particles fall and are collected within the lower portion of the reactor vessel 20. The oxygenated sludge is then rapidly removed and separated by the present invention.

To tune the reactor to different types and/or viscosities of sludge and to purge the channeling means of any blockage, the distance, and therefore the size of the channels within the first dispersing means, are adjustable. As illustrated in FIG. 1, one end of shaft 48 is attached to the first dispersing means (not shown). The other end of shaft 48 is attached to the lift bar or plate 50. The lift bar or plate 50 is raised or lowered by activating hydraulic lift means secured to the cylinder mounting plate 52, which is bolted to the flange. A gasket (not shown) is located between the bottom of the plate and the top of the flange to maintain a fluid-tight seal. Thus, hydraulic cylinders are mounted to plate 52 and hydraulic cylinder piston rods are attached to the underside of lift bar or plate 50. To raise upper bar or plate 50 and therefore shaft 48 and the first dispersing means, pressurized hydraulic fluid flows from the hydraulic supply and pump system (not shown) described in detail in the original patent and co-pending application.

The oxygen-rich atmosphere within the upper portion of each of the treatment vessels is supplied through a manifold system best illustrated in FIG. 1. While some activation of the sludge would occur in an atmosphere of air, the sludge becomes more highly activated and more completely treated when small sludge particles fully interact with an oxygen-rich atmosphere. It is presently preferred to use an oxygen-rich atmosphere, by which oxygenation occurs still more quickly and completely.

As used herein, the terms "oxygen" and "oxygen-rich atmosphere" mean that the atmosphere contained in the upper portion of the treatment vessel is substantially comprised of oxygen in the form of $O_2$ gas and/or $O_3$ gas (ozone). It is presently preferred to have a mixture of $O_2$ and $O_3$ in the proportion of about 90%–95% by volume $O_2$ and 5%–10% by volume of $O_3$. The presently preferred pressure range is about forty-five pounds per square inch gauge (psig) to about sixty-five psig. It is believed that sixty psig is the optimum pressure to be used in accordance with the present invention.

$O_2$ from a source such as a liquid oxygen tank (not shown) is pumped through $O_2$ supply conduit 54 and remote controlled $O_2$ inlet valve 56 into an $O_2$ manifold 58 associated with each treatment vessel 20, 20'. Along the length of $O_2$ manifold 58 are several $O_2$ entry ports (not shown) through which $O_2$ flows into the upper portion of treatment vessel 20. Ozone is generated by any conventional ozone generator, not illustrated. The ozone is then pumped through $O_3$ supply conduit 60 through remote controlled $O_3$ inlet valve 62 and into $O_3$ manifold 64. $O_3$ entry ports (not shown) allows the ozone to enter the upper portion of treatment vessel 20, 20'.

To flush the upper portion of any undesirable gas and to release the gas pressure within treatment vessel 20, there is provided an outlet conduit 68 and a remote controlled outlet or bleed-off valve 70. Outlet conduit 68 can be vented to the atmosphere, to pollution control equipment, or to other storage or treatment means not directly relevant to the presently described assembly. A pressure relief conduit 69 and valve 71 are connected to the upper portion of the treatment vessel. The threshold of the pressure relief valve can be adjusted depending upon the particular circumstances involved in the treatment system. A pressure sensor 66 includes pressure sensing means and a signal generating means of conventional design to indicate the pressure within the upper portion of treatment vessel 20.

The components of the present invention preferably are interrelated to a local control station (not shown) for controlling the operation of input of sludge to be treated, treated sludge output, hydraulic mixing, driving and pumping means, $O_2$ and $O_3$ supply means, gas outlet means and the like. The local control stations preferably are controlled by a master control station, including data processing means. A greater detailed description of the operation of the system is disclosed in the original patent.

During the treatment process, samples of the processed sludge will be taken from the vessel through a sampling conduit 72 and sampling valve 74. The sludge will be subjected to testing to determine if it is substantially completely oxygenated. It is believed that the optimum time for processing the sludge within the preferred embodiments of reactor assembly 20 described herein would be from about 30 minutes to about 120 minutes. It is believed that the optimum treatment time would be about 60 minutes. The actual time depends on a myriad of factors, all of which could be collected and analyzed to create a base of information on which further fully automated runs could be developed.

When the sludge is fully treated in accordance with the specifications of the particular type of sludge, community standards and the like, the treated sludge is removed from the reactor assemblies 18 as follows. The reactor mixer 26 and reactor circulation pump 44 are deactivated. The pressure in the treatment vessel 20 is controlled by adjusting the $O_2$ and $O_3$ inlet valves 56 and 62 and by adjusting the gas outlet valve 70 to raise or lower the pressure within the hyperbaric vessel to accommodate the composition of the sludge in the vessel for release purposes. Once an effective pressure is achieved within the reactor vessel, remote control reactor outlet valve 76 is rapidly opened by which the treated sludge 22 is propelled by the pressurized oxygen in the upper portion of hyperbaric treatment vessel 20 through the outlet conduits for further treatment. Valve 76 must be a valve controlled by a solenoid r other device known to those skilled in the art and to allow for rapid opening, rather than a gradual opening as in the case of a bleed valve. A manual or remote controlled valve 77 usually remains open, but can be closed if desired. Valve 77 can function as a safety valve, particularly when it is manual. If valve 77 is remote controlled, it can function as an alternate valve like valve 76 to quickly release the sludge propelled by the pressurized oxygen. The sludge flows through discharge piping 78, preferably using a downwardly sloping, gravity flow system towards the separation apparatus 80.

The pressure differential created between the hyperbaric vessel 20 and the separation apparatus 80 maintained at a pressure lower than vessel 20 results in the rapid removal of the oxygenated sludge 22. The pressure differential can be adjusted to accommodate various compositions of sludge or to increase the removal rate of the treated sludge. In addition, the pressure can be adjusted to enhance the subsequent separation of the sludge within the separation apparatus.

The treated sludge possesses a large amount of absorbed and dissolved gas which is kept under pressure within the hyperbaric treatment vessel. When the sludge enters the separation apparatus, there is a rapid pressure reduction which results in the expansion of the dissolved gas. The net result is the substantially instantaneous commencement of the percolation process. The rapid diffusion of the expanding gas through the separation apparatus agglomerates the solid particles of the treated sludge into large collections of particles. It is believed that this effect occurs through a combination of adhesion and hydrophobic forces. In addition, the rapid diffusion results in the flotation of these larger sludge agglomerations to the top of the liquid level.

The percolation process culminates in separating the treated sludge into its various components of gas, solids and liquid. The gas released from the oxygenated sludge in the separation apparatus is removed by a gas collecting and disposing means 82, which includes a conventional hood and blower suction device 84, 86, respectively. A typical collecting and skimming means 88 removes the agglomerated sludge from the separation apparatus. In addition, a liquid collecting means 90 removes the excess liquid or "dewaters" the treated sludge mixture. The various components separated from the treated sludge are transferred into additional apparatus for further processing, refining or disposal.

The present invention may be embodied in other specific forms without departing from the spirit or the central attributes thereof, and, accordingly, reference should be made to the appended claims rather than the foregoing specification as indicating the scope of the invention.

I claim:

1. An apparatus for use in a sewage sludge treatment system comprising means for enhancing the surface area of the sludge to be treated and its interaction with a pressurized oxygen-rich atmosphere to produce a treated sludge with absorbed and dissolved gas and means for rapidly removing the treated sludge from a lower portion of a vessel for subsequent rapid sludge separation releasing the absorbed and dissolved gas from the treated sludge, the means for enhancing the surface area of the sludge and its interaction with a pressurized oxygen-rich atmosphere including a hyperbaric vessel including a sludge inlet means for conveying sludge to the vessel to be accumulated in a lower portion of the vessel, a sludge delivery means having a discharge end for delivering sludge particles from the lower portion to an upper portion of the vessel, oxygen inlet means for delivering oxygen to the upper portion of the vessel to oxygenate the sludge particles at a hyperatmospheric pressure therein to produce the treated sludge, the oxygenated treated sludge particles falling to and being collected in the lower portion of the vessel, gas outlet means for removing gas from the upper portion of the vessel, the means for rapidly releasing absorbed and dissolved gas from the treated sludge including a treated sludge outlet means for rapidly removing the oxygenated treated sludge from the lower portion of the vessel using the pressurized oxygen as a propellant, the sludge outlet means comprising a discharge pipe connected to the lower portion of the vessel for conducting sludge to a separation apparatus maintained at a lower pressure than the pressure in the vessel, and a rapidly opening valve means controlling flow of the oxygenated sludge through the discharge pipe.

2. Apparatus according to claim 1 wherein the separation apparatus includes a means for collecting and disposing of gas released from the oxygenated treated sludge, a means for collecting and skimming off agglomerated treated sludge, and a means for collecting and removing excess liquid from the treated sludge mixture.

3. Apparatus according to claim 2 wherein the sludge inlet means, the sludge delivery means, the oxygen inlet means, the gas outlet means, the separation apparatus gas disposing means, the separation apparatus sludge skimming means, and the separation apparatus liquid removing means all include valve means to control the flow of material through conduits associated with the respective means.

4. Apparatus according to claim 3 wherein the valve means includes manually controlled valves.

5. Apparatus according to claim 3 wherein the valve means includes remotely controlled valves.

6. Apparatus according to claim 3 wherein the separation apparatus gas disposing means includes a hood and blower suction device.

7. Apparatus according to claim 1 wherein the discharge piping which conducts the treated sludge is a gravity flow system.

8. A process for treating sewage sludge comprising: enhancing the surface area of the sludge and its interaction with a pressurized oxygen-rich atmosphere and to rapidly remove treated sludge from a vessel for subsequent rapid sludge separation by the steps of (a) delivering particles of the sludge to an upper portion of a hyperbaric vessel containing a pressurized oxygen-rich atmosphere where the particles interact with the oxygen to form oxygenated sludge containing absorbed and dissolved gas;

(b) collecting the oxygenated sludge particles containing absorbed and dissolved gas within a lower portion of the vessel; and (c) rapidly releasing the absorbed and dissolved gas from the oxygenated sludge by removing the oxygenated sludge rdpidly from the vessel through a discharge pipe to a separation apparatus as a result of a pressure differential created between the hyperbaric vessel and the separation apparatus at a pressure lower than the pressure in the hyperbaric vessel.

9. A process according to claim 8 including the further step of separating the treated sludge by percolation means into its various conponents of gas, solids, and liquid.

10. A process according to claim 9 including the further step of transferring the various components of gas, solids and liquid into additional apparatus for further processing and refining.

11. A process according to claim 8 wherein the sludge is preliminarily mixed with acid prior to delivery of the sludge to the hyperbaric vessel.

12. A process according to claim 11 wherein the acid mixing step adjusts the pH of the sludge and acid mixture to a pH of from about 3 to about 4.5.

13. A process according to claim 8 wherein the oxygen-rich atmosphere comprises oxygen and ozone.

* * * * *